(12) United States Patent
Zhang et al.

(10) Patent No.: US 12,276,565 B2
(45) Date of Patent: *Apr. 15, 2025

(54) ELECTRICAL TEST OF OPTICAL COMPONENTS VIA METAL-INSULATOR-SEMICONDUCTOR CAPACITOR STRUCTURES

(71) Applicant: Cisco Technology, Inc., San Jose, CA (US)

(72) Inventors: Xunyuan Zhang, Mechanicsburg, PA (US); Ravi S. Tummidi, Breinigsville, PA (US); Tony P. Polous, San Jose, CA (US); Mark A Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,412

(22) Filed: Apr. 7, 2023

(65) Prior Publication Data

US 2023/0243718 A1  Aug. 3, 2023

Related U.S. Application Data

(63) Continuation of application No. 17/443,280, filed on Jul. 23, 2021, now Pat. No. 11,686,648.

(51) Int. Cl.
*G02B 6/12* (2006.01)
*G01M 11/00* (2006.01)

(52) U.S. Cl.
CPC ......... *G01M 11/30* (2013.01); *G02B 6/12007* (2013.01); *G02B 2006/12061* (2013.01); *G02B 2006/12145* (2013.01); *G02B 2006/12164* (2013.01)

(58) Field of Classification Search
CPC .................................................. G02B 6/12007
See application file for complete search history.

(56) References Cited

U.S. PATENT DOCUMENTS

2010/0121607 A1 * 5/2010 Nabatova-Gabain ........................
G01B 11/065
702/172

FOREIGN PATENT DOCUMENTS

| EP | 3462511 A1 * | 4/2019 | ......... H01L 51/0096 |
| JP | 2005026471 A * | 1/2005 | |

OTHER PUBLICATIONS

JP-2005026471-A English translation (Year: 2005).*

* cited by examiner

*Primary Examiner* — Charlie Y Peng
(74) *Attorney, Agent, or Firm* — Patterson + Sheridan, LLP (57) ABSTRACT

Electrical test of optical components via metal-insulator-semiconductor capacitor structures is provided via a plurality of optical devices including a first material embedded in a second material, wherein each optical device is associated with a different thickness range of a plurality of thickness ranges for the first material; a first capacitance measurement point including the first material embedded in the second material; and a second capacitance measurement point including a region from which the first material has been replaced with the second material.

20 Claims, 9 Drawing Sheets

ELECTRICAL TEST OF OPTICAL COMPONENTS VIA METAL-INSULATOR-SEMICONDUCTOR CAPACITOR STRUCTURES

CROSS-REFERENCE TO RELATED APPLICATIONS

This application is a continuation of co-pending U.S. patent application Ser. No. 17/443,280 filed Jul. 23, 2021. The aforementioned related patent application is herein incorporated by reference in its entirety.

TECHNICAL FIELD

Embodiments presented in this disclosure generally relate to optical component test in photonic chips via electrical characteristics of the optical components. More specifically, embodiments disclosed herein relate to the test and characterization of waveguide material layers, such as Silicon Nitride, for the acceptance or adjustment and switching of optical paths in devices including those waveguide material layers.

BACKGROUND

Test and characterization of optical components in photonic chips is often performed with an on-chip or external light source directing light through various optical components. Various diagnostic elements evaluate the qualities of the light (e.g., frequency/wavelength, phase, and amplitude) at various taps or exit points along the light paths to determine the operational characteristics of the photonic chips. These optical tests can require complex on-chip test circuitry or layout, the use of external testing devices, and generally are time consuming to perform.

These tests can be performed to account for variation during fabrication of photonic devices and the components thereof on Photonic Integrated Circuits (PICs). These tolerances can vary from layer to layer in a fabricated device. For example, silicon photonic devices fabricated on Silicon On Insulator (SOI) wafers can include a device layer (fabricated on a Si or other semiconductor layer) with a variation in thickness of roughly X %, but can include other deposited or bonded layers (e.g., a Silicon Nitride waveguide layer) with variations in thickness that translate to roughly ±Y nm (nanometers). The differences in tolerances, and the sensitivity to variation that the different layers have can lead to stacking tolerances that, although every individual layer is within manufacturing tolerances, the overall effectiveness of the fabricated device is out of tolerance; leading to low yields in the manufacturing process, devices that perform sub-optimally, and/or difficult-to-scale construction processes to reduce the tolerances.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a system, including: a plurality of optical devices including a first material embedded in a second material, wherein each optical device is associated with a different thickness range of a plurality of thickness ranges for the first material; a first capacitance measurement point including the first material embedded in the second material; and a second capacitance measurement point including a region from which the first material has been replaced with the second material.

One embodiment presented in this disclosure is a method, comprising: forming a first layer of a first material; forming a second layer of a second material on the first layer; removing portions of the second layer to form a plurality of waveguides and a first measurement region of the second material in the second layer and a second measurement region that omits the second material; forming a third layer of the first material on the second layer, wherein forming the third layer fills the second measurement region with the first material; forming a first capacitance measurement point that includes the plurality of waveguides and the first measurement region; and forming a second capacitance measurement point that includes the plurality of waveguides and the second measurement region.

One embodiment presented in this disclosure is a method, comprising: determining a first capacitance at a first capacitance measurement point, wherein the first capacitance measurement point includes a first region of a first material at a given distance from a substrate, wherein a plurality of waveguides are made of the first material; determining a second capacitance at a second capacitance measurement point, wherein the second capacitance measurement point includes a second region of a second material at the given distance from the substrate shared with the plurality of waveguides made of the first material; determining a thickness of the first region based on the first capacitance and the second capacitance; and defining an optical pathway through a subset of waveguides of the plurality of waveguides, wherein the subset of waveguides is associated with optical characteristics corresponding to the thickness.

EXAMPLE EMBODIMENTS

The present disclosure provides for the electrical test of optical components. By co-locating various optical components under test with capacitance measurement points, and pairing those capacitance measurement points with other capacitance measurement points that omit the optical components, a difference in capacitance is correlated to the thickness (or presence) of the optical component. Because the thicknesses of various optical components can vary greatly due to manufacturing processes, but are expected to be consistent over a given layer, a thickness measurement taken at one location can be expanded to determine the thickness of that layer elsewhere in a photonic chip. Using this thickness measurement, a fabricator can quickly determine the operational range of the photonic chip, without having to test the optical properties of the photonic chip (e.g., without transmitting and measuring test optical signals). Accordingly, the electrically-determined thickness measurements allow the fabricator to pass or reject the chip during product testing based on the expected optical properties of the photonic chip at the determined thickness for the tested optical component. Additionally or alternatively, the electrically-determined thickness measurements allow the fabricator to select a signal pathway chosen to compensate for the determined thickness.

Figure 1A:
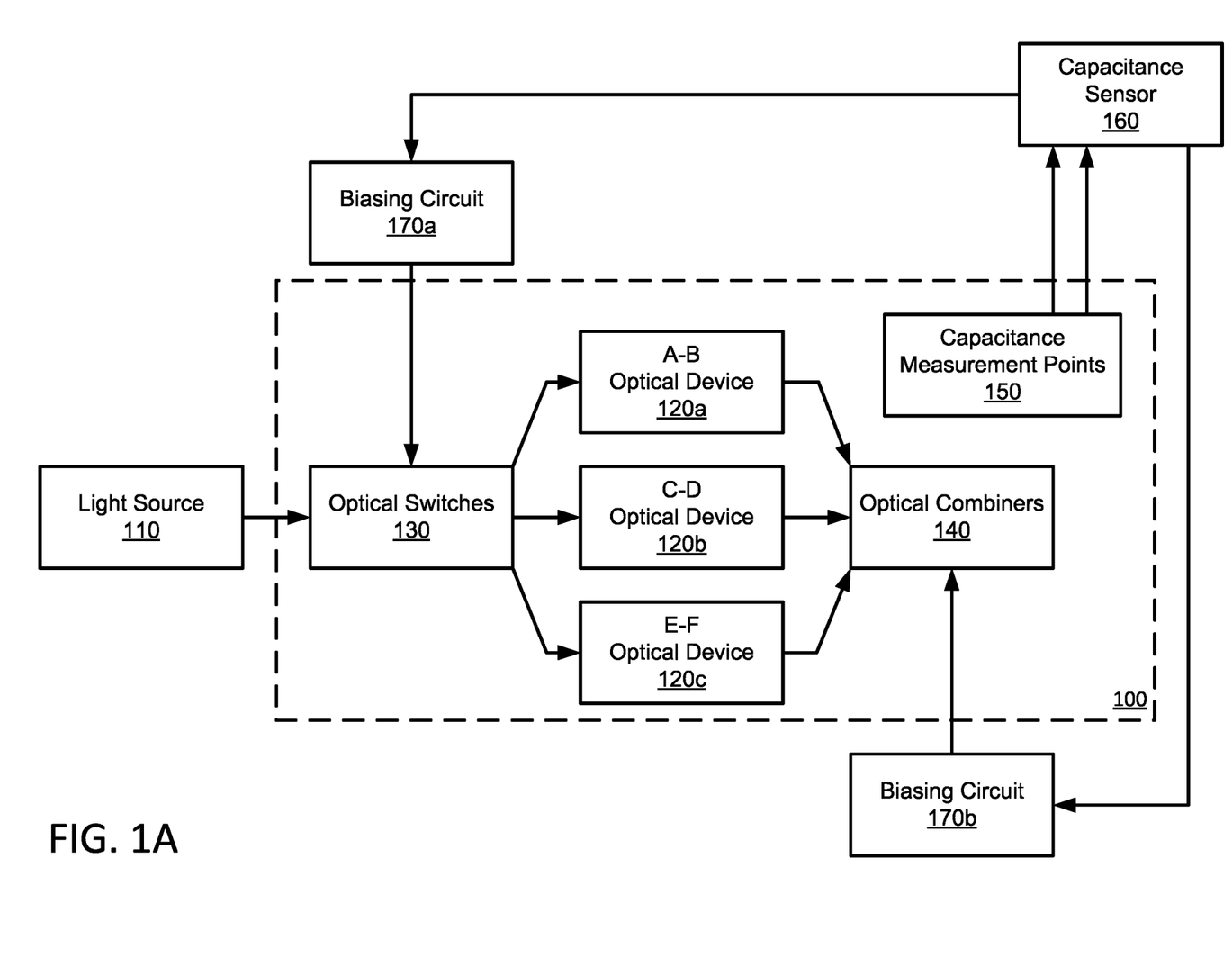
FIGS. 1A-1B are block diagrams of photonic chips, according to embodiments of the present disclosure.
Figure 1B:
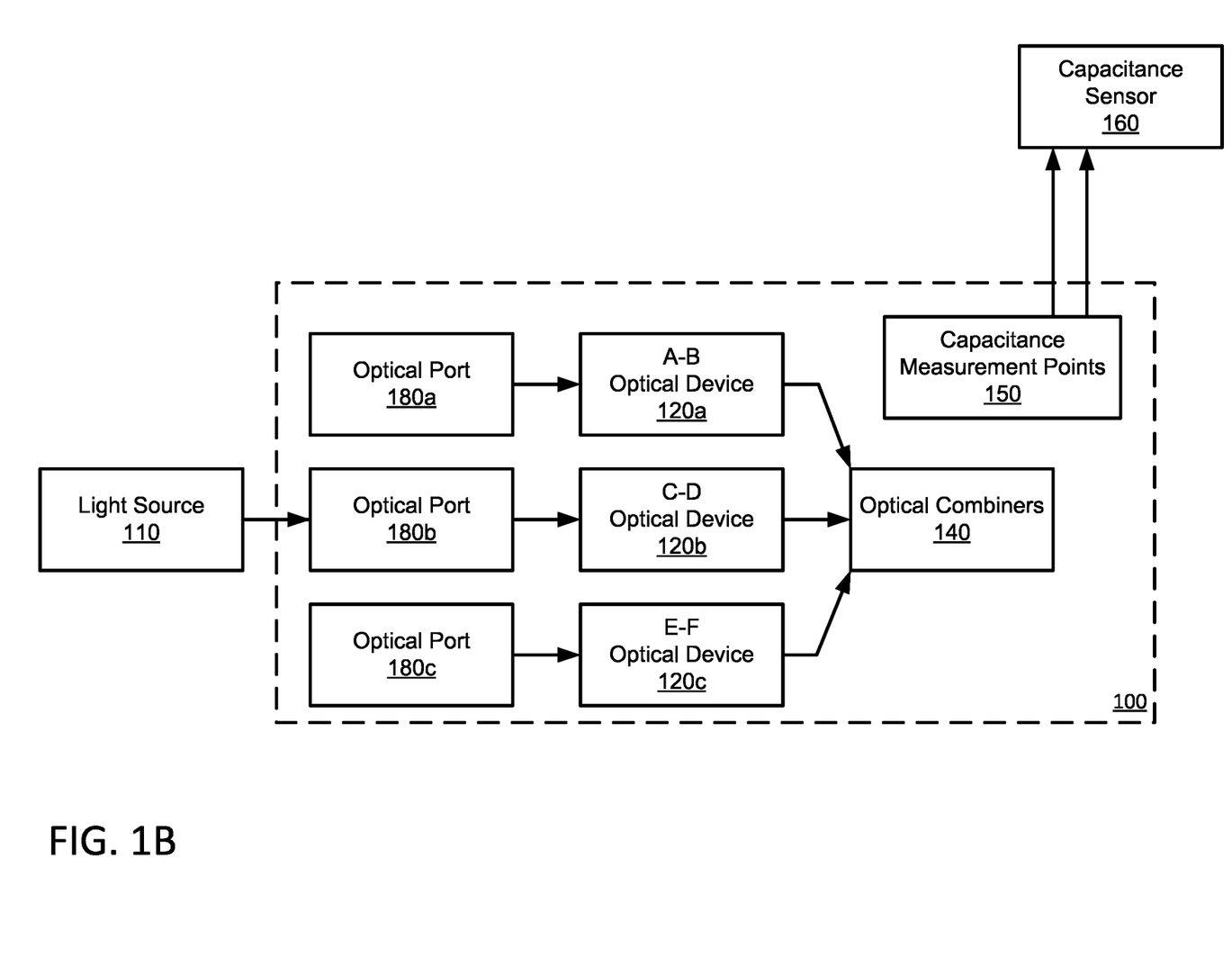

FIGS. 1A-1B are block diagrams of photonic chips 100, according to embodiments of the present disclosure. In operation, a light source 110 generates various optical signals that are carried in and operated on by the photonic chip 100 (e.g., converting optical signals to electrical signals, modulating data onto carrier optical signals, repeating optical signals, etc.). Accordingly, in various embodiments, the light source 110 may be included on the photonic chip 100 or may be an external element connected to the photonic chip 100 by various fiber optic linkages, abutting couplers, evanescent couplers, and the like.

In various embodiments, the incoming optical signal from the light source 110 (whether internal or external) is routed to different optical devices 120a-c (generally or collectively, optical devices 120) by various waveguides. In some embodiments, such as in FIG. 1A, various optical switches 130 are located between the light source 110 and the optical devices 120 to selectively direct the optical signals to selected ones of the optical devices 120. In other embodiments, such as in FIG. 1B, the optical switches 130 can be omitted or included on a separate photonic platform from the photonic chip 100 that includes the optical devices 120. Instead, various optical ports 180a-c (generally or collectively, optical port 180) are included between the light source 110 and the individual optical devices 120 to form a light path between the light source 110 and a selected optical device 120.

The outputs from the optical devices 120 can be received and routed through a set of optical combiners 140, which can include a similar or different arrangement of signal routing components to those used in the optical switches 130. Various arrangements of example optical devices 120, optical switches 130, and optical combiners 140 are discussed in greater detail in regard to FIGS. 2A-2C.

The fabricator uses various optical switches 130 and optical combiners 140 to control the input and output of optical signals through the selected (and not through the non-selected) optical devices 120. Depending on the arrangement and the components that the selective photonic element is connected to, the selective photonic element may be one-directional (i.e., allowing for signal direction in one designated direction) or bidirectional (i.e., allowing for signal transmission in either direction). For ease of explanation, the present disclosure describes operation of the various photonic devices herein for one-directional pathways moving from left-to-right when viewing the Figures. But the present disclosure also covers using right-to-left one-directional pathways (i.e., the opposite signaling direction from what is generally given in the examples) and bidirectional pathways (e.g., substituting an understanding of a splitter/demultiplexer to operate as a combiner/multiplexer when used in reverse).

The optical switches 130 and optical combiners 140 may operate according to various schemas, including physical switches that route signals by linking different input/output pairs, electro/magnetic switches that use electromagnetic effects to route light, and thermally controlled switches (e.g., Mach-Zehnder Interferometers) that phase shift paired optical signals to extinguish one optical signal and transmit another on output leads from the switch. For example, in a thermally controlled switch, a received signal is split into two complementary signals, each with half of the original amplitude, which can be phase shifted relative to one another so that when re-combined, the resulting output signal is equal to the original amplitude or reduced to zero. The phase shifters in the thermally controlled switch heat the transmission medium in the switch to control a level of phase shift on a given arm (e.g., between 0-7 radians) and thereby the amplitude of the signals output from the optical switches 130 and optical combiners 140.

When optical signals are received by an optical switch 130 connected to an input (e.g., via a receiver arm), the optical switch 130 is configured as a splitter that outputs an optical signal received from the input to one of the connected optical devices via a respective output arm (e.g., a primary output arm for the first optical device 120a, a secondary output arm for the second optical device 120b, etc.). The optical combiner 140 is therefore configured as a combiner that receives outputs from any of the optical devices 120, via respective input arms (e.g., a primary input arm for the first optical device 120a, a secondary input arm for the second optical device 120b, etc.), and places the output onto a single shared transmission pathway (e.g., via a transmitter arm). To distinguish the various input/output arms of the optical switches 130 and optical combiners 140, a first splitter/combiner can be described as having a first primary, first secondary, first tertiary, first n-ary input arms or output arms, a second splitter/combiner can be described as having a second primary, second secondary, second tertiary, second n-ary input arms or output arms, and an nth splitter/combiner can be described as having an nth primary, nth secondary, nth n-ary input arms or output arms as necessary to identify which splitter or combiner a particular arm belongs to.

The optical devices 120, which can include various filters, multiplexers, demultiplexers, amplifiers, attenuators, lenses, taps (e.g., for probes to measure characteristics of the optical signal carried thereon), microrings, optical resonators, splitters, optical modulators, optical mode multiplexers, 2×2 optical couplers, combined optical devices, etc., are, in various embodiments, the same type of device as one another, but are constructed with different tolerance ranges. As the optical devices 120 can include various passive devices, which are not powered or externally controlled or tuned after fabrication, the fabricated tolerance ranges of different optical devices 120 allow the operator or fabricator to select (via the optical switches 130 and optical combiners 140) various ranges to use during operations, without having to expend power to tune an active device. In some embodiments, the optical devices 120 include active devices, which are powered or externally controlled or tuned after fabrication, but which may not be controllable/tunable across the full fabrication range of the process being compensated for.

The tolerance ranges for the optical devices 120 indicate a fabrication range that a given optical device 120 compensates for in relation to a separate process of fabricating the photonic element. For example, when a first optical device 120a is described as having a tolerance range of 50-60 nm, the first optical device 120a is not (necessarily) constructed to have a thickness of 50-60 nm, but rather is constructed so that a later process, if applied with a thickness of 50-60 nm to the first optical device 120a, will result in the first optical device 120a passing operational tests.

As illustrated in FIGS. 1A-1B, the first optical device 120a has a tolerance range of A-B, the second optical device 120b has a tolerance range of C-D, and the third optical device 120c has a tolerance range of E-F, to indicate that the optical devices 120 have adjacent ranges. Any of the optical devices 120 may offer the upper or lower portion of the range and the fabricator can select between the optical devices 120 to select the given optical device 120 that offers a tolerance range aligned with the result of the compensated-for process (e.g., satisfying an operational specification based on the outcome of the compensated-for process). The different ranges (e.g., A-B C-D, E-F) discussed herein will be understood to include overlapping ranges (e.g., where $A>C>B>E>D>F$), adjacent non-overlapping ranges (e.g., where, $A>B=C>D=E>F$), and non-adjacent non-overlapping ranges (e.g., where $A>B>C>D>E>F$) in various embodiments. In each of the ranges discussed herein, A is a first upper range value and B is a first lower range value (i.e., $A>B$ for the first range A-B), and C is a second upper range value and D is a second lower range value (i.e., $C>D$ for the second range C-D), etc. As will be appreciated, tolerances can allow for the overlap of the nominally non-overlapping ranges. For example, a first optical device 120a and a second optical device 120b can have respective thickness ranges of 40-50 nm and 50-60 nm each ±5 nm, which could result in the first optical device 120a having a range of 35-55 nm and the second optical device 120b having a range of 45-65 nm.

Although the present disclosure primarily gives examples of the compensated-for process being performed during the construction of the photonic chip 100 itself (including the optical devices 120 thereof), in some embodiments, the differently ranged optical devices 120 can be additionally or alternative configured to compensate for processes and tolerances of separately fabricated devices connected to or mated with the selective photonic chip 100. For example, the photonic chip 100 can be constructed with two (or more) differently ranged optical devices 120 that intentionally operate within different tolerances, but are provided to compensate for an external optical device (e.g., a light source 110). For example, a first optical device 120a can be selected when a light source 110 operates within specification, while a second optical device 120b can be selected when the light source 110 operates out of specification (e.g., bringing the optical signal back into specification for an optical receiver). Accordingly, the photonic chip 100 can be provided to compensate for the fabrication processes of an external device and relax the process margins thereof by selecting the optical device 120 matched to the operational profile of the separately fabricated external device.

To determine which, if any, of the optical devices 120 the optical signals should be routed through, the photonic chip 100 includes several capacitance measurement points 150 disposed in different locations on the photonic chip 100. Capacitance measurements at paired capacitance measurement points 150 can provide a difference value that a capacitance sensor 160 can translate into a thickness of an optical component or layer that is present at one capacitance measurement point 150 that is absent from the other capacitance measurement point 150. In various embodiments, the capacitance measurement points 150 are provided as metal-insulator-semiconductor capacitors (MISCAPs), such as those illustrated in FIGS. 5A and 5B.

A capacitance sensor 160 is provided to measure the individual capacitances at the various capacitance measurement points 150 and, in some embodiments, to calculate a thickness of a measured optical component or layer co-located with a subset of the capacitance measurement points 150. In various embodiments, the capacitance sensor 160 is included in the photonic chip 100, while in other embodiments, the capacitance sensor 160 is an external device that can be permanently or temporarily connected to the capacitance measurement points 150. When the various optical device 120 are configured to operate in different ranges for the thickness of an optical component or layer, the capacitance measurement/thickness reading can be used to select an optical path through any corresponding set of optical devices 120 or to reject the photonic chip 100 as outside of manufacturing specifications.

In some embodiments, such as in FIG. 1A, the capacitance measurement/thickness reading is transmitted from the capacitance sensor 160 to various biasing circuits 170a-b (generally or collectively, biasing circuit 170) to define an optical pathway through the various optical switches 130 and optical combiners 140. The biasing circuits 170 apply power to the various elements, such as interferometers, to extinguish optical transmissions on some pathways, and allow optical transmission to proceed on other pathways. In other embodiments, such as in FIG. 1B, various passive (e.g., unpowered) or off-chip devices are used to route the optical pathways through the optical devices 120 configured to operate with specification for the manufactured thickness of the measure optical component or layer.

Figure 2A:
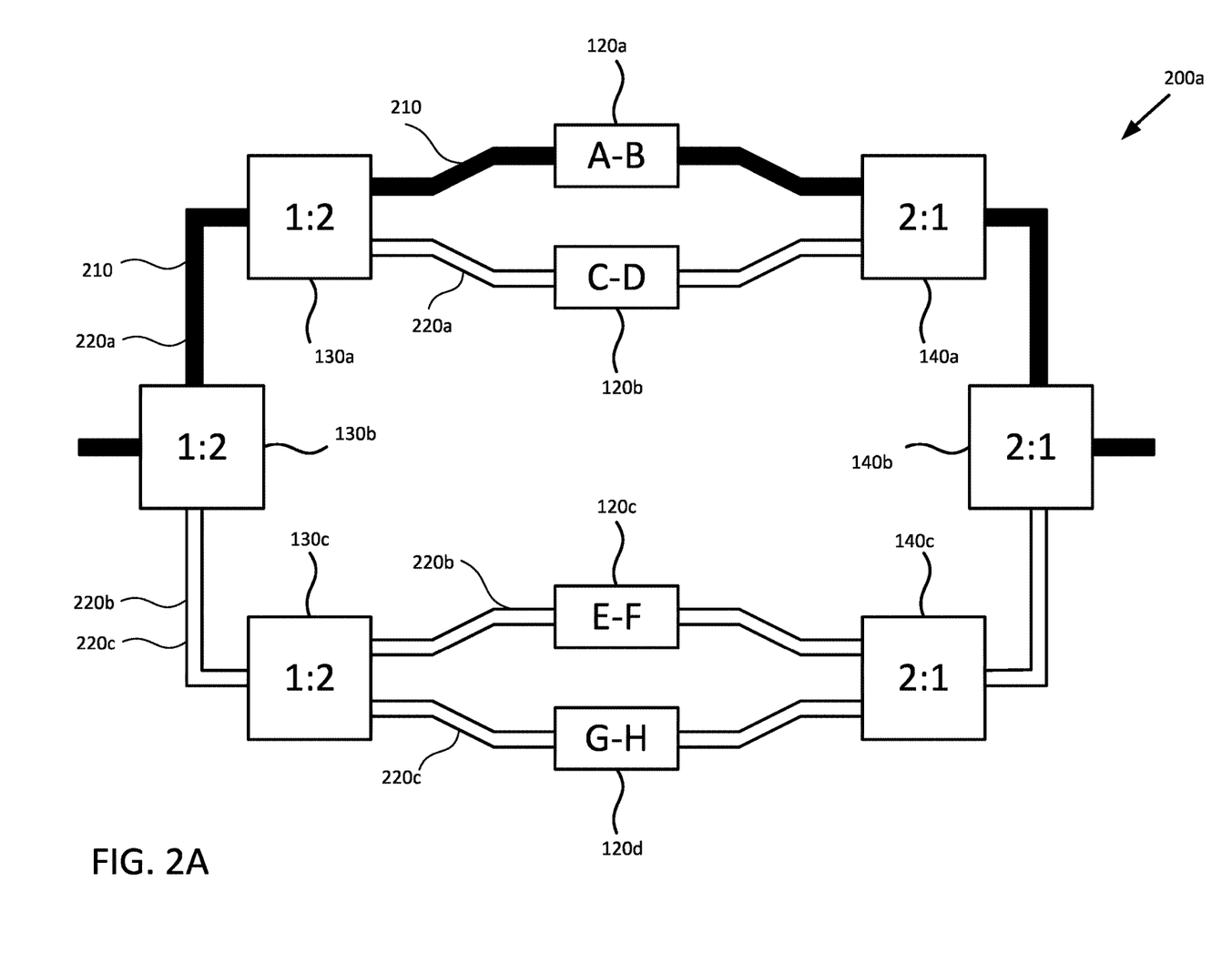
FIGS. 2A-2C illustrate example architectures for routing optical signals, as may be used in the optical switches or optical combiners, according to embodiments of the present disclosure.
Figure 2B:
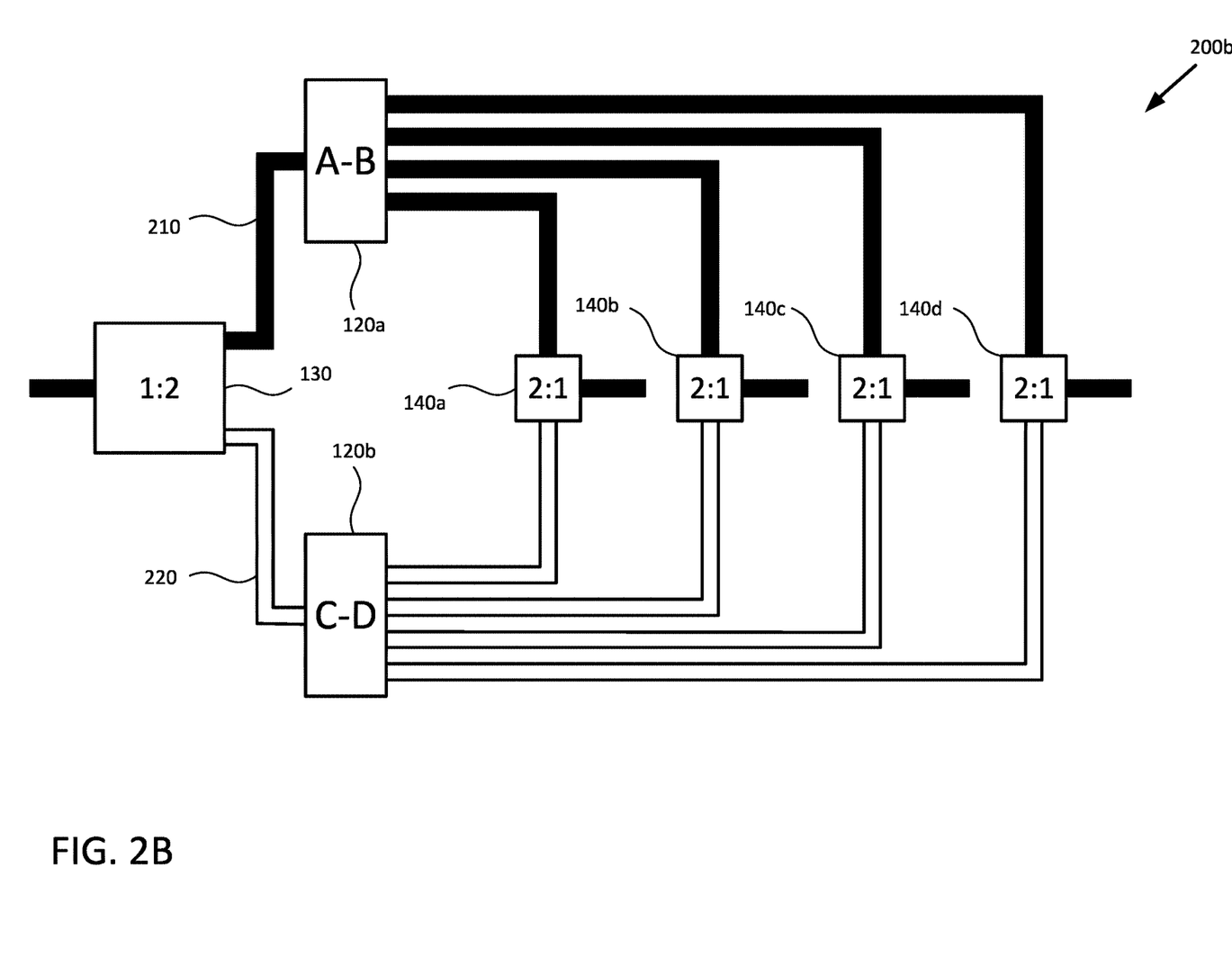
Figure 2C:
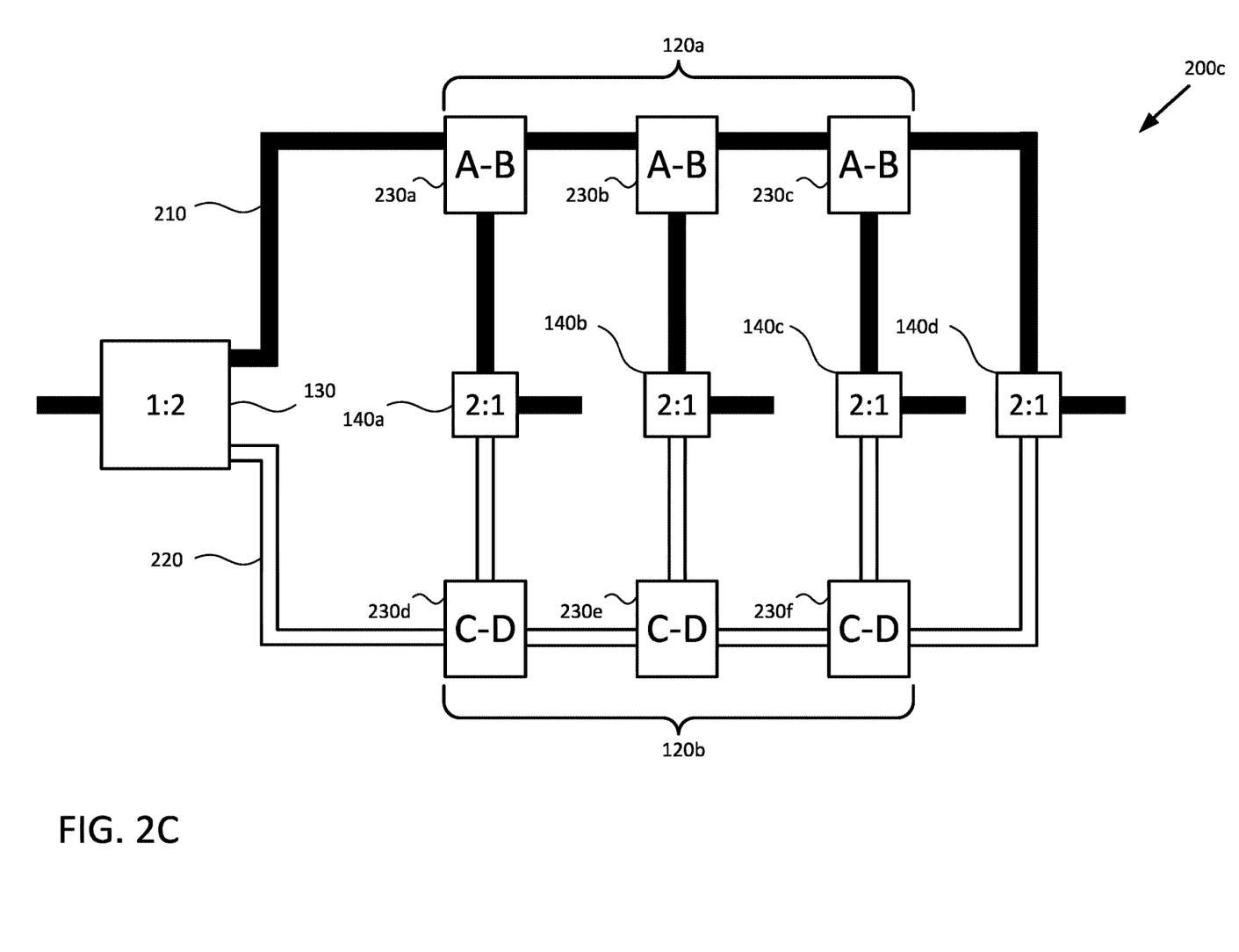

FIGS. 2A-2C illustrate example architectures 200a-c for routing optical signals, as may be used in the optical switches 130 or optical combiners 140, according to embodiments of the present disclosure. Each of the architectures 200a-c illustrate one enabled optical path 210 (shown in black) and one or more disabled (or un-enabled) optical paths 220a-c (shown in white). Depending on the biasing signals applied to the optical switches 130 and the optical combiners 140, different routes for the optical signals (e.g., over the disabled optical paths 220a-c) can be enabled in other embodiments.

FIG. 2A illustrates a four-way architecture 200a of a selective photonic element to improve the yield of photonic device fabrication, according to embodiments of the present disclosure. The four-way architecture 200a can be understood as a two-way architecture that includes nested two-way architectures as part of the optical devices 120. The fabricator can choose, via a second optical switch 130b and a second optical combiner 140b, whether to route a signal through the first two-way architecture or the second two-way architecture and select, via the selected two-way architecture which optical device 120 to route the signal through.

When selecting either the first or second optical device 120a-b for use, the fabricator activates the second optical switch 130*b* to send optical signals to the first optical switch 130*a* and activates the second optical combiner 140*b* to receive optical signals from the first optical combiner 140*a*. The fabricator then similarly chooses which pathway from the first optical switch 130*a* (and first optical combiner 140*a*) to activate to route the optical signals to the intended one of first optical device 120*a* or the second optical device 120*b*.

When selecting either the third or fourth optical device 120*c-d* for use, the fabricator activates the second optical switch 130*b* to send optical signals to the third optical switch 130*c* and activates the second optical combiner 140*b* to receive optical signals from the third optical combiner 140*c*. The fabricator then similarly chooses which pathway from the third optical switch 130*c* (and third optical combiner 140*c*) to activate to route the optical signals to the intended one of third optical device 120*c* or the fourth optical device 120*d*.

By adding and removing hierarchies of optical switches 130 and optical combiners 140 and optical devices 120, one will be able to create n-way architectures to accommodate any number of optical devices 120. When creating an n-way architecture with an even number of optical devices 120, several levels of two-way architectures may be layered, such as to produce a four-way architecture 200*a* illustrated in FIG. 2A. When creating an n-way architectures with an uneven number of optical devices 120, several levels of two-way architectures may be layered, and at least one layer includes a direct optical path.

FIG. 2B illustrates a multiplexed two-way architecture 200*b* of a selective photonic element to improve the yield of photonic device fabrication, according to embodiments of the present disclosure. When the optical devices 120 are demultiplexers (e.g., a first demultiplexer for the first optical device 120*a* and a second demultiplexer for the second optical device 120*b*) or multiplexers, the number of optical switches 130 and optical combiners 140 deployed by the fabricator on one side of the photonic element is greater than on the other side. For example, with a 4:1 demultiplexer, each demultiplexer receives one input, and produces four outputs, each of which may carry data on a different wavelength and/or at a different time division, and thus should be interpreted separately. As illustrated, the first optical device 120*a* is manufactured as a multiplexer according a tolerance range of A-B while the second optical device 120*b* is manufactured as a demultiplexer according to a tolerance range of C-D.

Accordingly, the first optical device 120*a* and the second optical device 120*b* are connected to an optical switch 130 on the input side (selectively receiving one input based on the operation of the optical switch 130) and output to each of the first through fourth optical combiners 140*a-d*, albeit with different signals extracted from the input signal to each of the optical combiners 140. As will be appreciated, other ratios of multiplexers and demultiplexers can be used as the optical devices 120 in the architectures discussed herein, with a corresponding number of optical combiners 140 making up the set of optical combiners 140.

In various embodiments, each of the switches in the optical combiners 140 is configured or tuned for operation to receive signals of a different wavelength from the demultiplexers. Input arms for each of the optical combiners 140 are connected to the demultiplexers and outputs of the optical combiners 140 are connected to various downstream components (e.g., photodetectors, light sources, wavelength-matched amplifiers, phase shifters (including thermal phase shifters), wavelength shifters, separate transmission lines, additional optics, etc.).

By adding and removing hierarchies of optical switches 130 and optical combiners 140 and optical devices 120, as described herein, one will be able to create multiplexed n-way architectures to accommodate any number of optical multiplexers or optical demultiplexers.

FIG. 2C illustrates a Bragg grating multiplexed two-way architecture 200*c* of a selective photonic element to improve the yield of photonic device fabrication, according to embodiments of the present disclosure. When the optical devices 120 are demultiplexers (e.g., a first demultiplexer for the first optical device 120*a* and a second demultiplexer for the second optical device 120*b*) or multiplexers, which can include various Bragg gratings 230*a-f* (generally, Bragg grating 230) to split signal onto different arms, in various embodiments. The Bragg gratings 230*a-c* of the first optical device 120*a* are manufactured according a tolerance range of A-B while the Bragg gratings 230*d-f* of the second optical device 120*b* are manufactured according to a tolerance range of C-D.

The first optical device 120*a* and the second optical device 120*b* are connected to an optical switch 130 on the input side (selectively receiving one input based on the operation of the optical switch 130) and output to each of the first through fourth optical combiners 140*a-d*, albeit with different signals extracted from the input signal to each of the optical combiners 140*a-d*. As will be appreciated, other ratios of multiplexers and demultiplexers can be used as the optical devices 120 in the architectures discussed herein, with a corresponding number of optical combiners 140 making up the set of optical combiners. In various embodiments, each of the switches in the optical combiners 140*a-d* is configured or tuned for operation to receive signals of a different wavelength from the demultiplexers. Outputs of the optical combiners 140*a-d* are connected to various downstream components (e.g., photodetectors, light sources, wavelength-matched amplifiers, phase shifters, wavelength shifters, separate transmission lines, additional optics, etc.).

In the Bragg grating demultiplexer two-way architecture 200*c* illustrated in FIG. 2C, the first optical device 120*a* is a demultiplexer that includes a first Bragg grating 230*a* connected at an input to the optical switch 130, at a first output to a first optical combiner 140*a*, and a second output to an input of a second Bragg grating 230*b*. The second Bragg grating 230*b* is in turn connected at a first output to a second optical combiner 140*b* and at a second output to an input of a third Bragg grating 230*c*. The third Bragg grating 230*c*, being the final Bragg grating 230 in the present example, is connected at a first output to a third optical combiner 140*c* and at a second output to a fourth optical combiner 140*d*. Similarly, the second optical device 120*b* is a demultiplexer that includes three Bragg gratings 230*d-f* arranged in a chain formation to sequentially demultiplex various signals from a combined signal received from the optical switch 130 to the individual optical combiners 140*a-d*. As will be appreciated, a demultiplexer including Bragg gratings 230 for use in demultiplexing n signals from a combined signal includes n−1 Bragg gratings 230 arranged in a chained formation.

Figure 3:
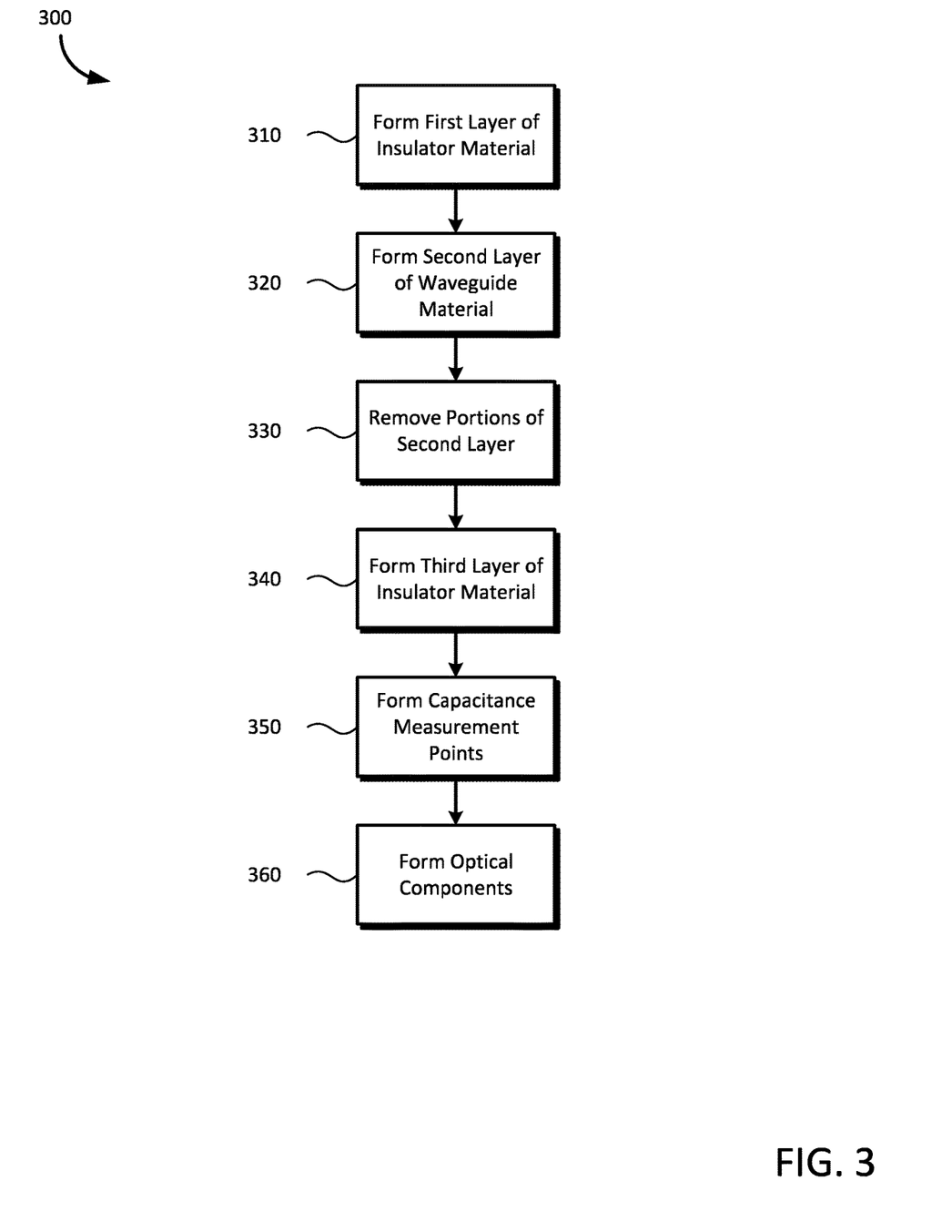
FIG. 3 is a flowchart of a method for fabricating a photonic device capable of being configured based on capacitance measurements of the optical components defined therein, according to embodiments of the present disclosure.

FIG. 3 is a flowchart of a method 300 for fabricating a photonic device capable of being configured based on capacitance measurements of the optical components defined therein, according to embodiments of the present disclosure. Method 300 may be understood with reference to FIGS. 4A-4D, which illustrate cross-sectional views of a device fabricated according to method 300, according to embodiments of the present disclosure. Method 300 may also be understood with reference to FIGS. 5A-5B, which illustrate cross-sectional views of two capacitance measurement points 150.

Figure 4A:
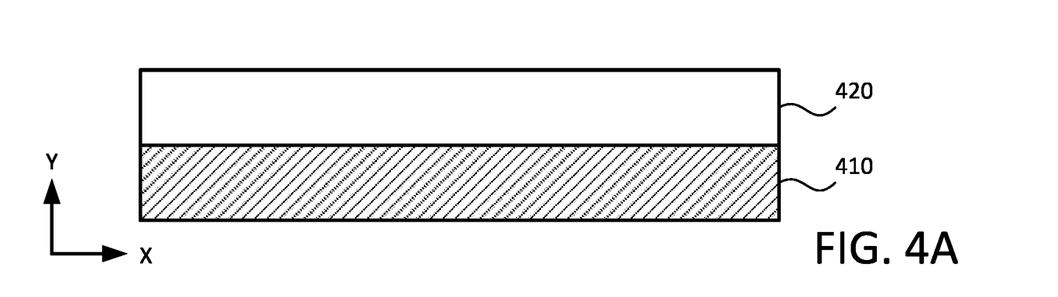
FIGS. 4A-4D illustrate cross-sectional views of a device fabricated according to method 300, according to embodiments of the present disclosure.
Figure 4B:
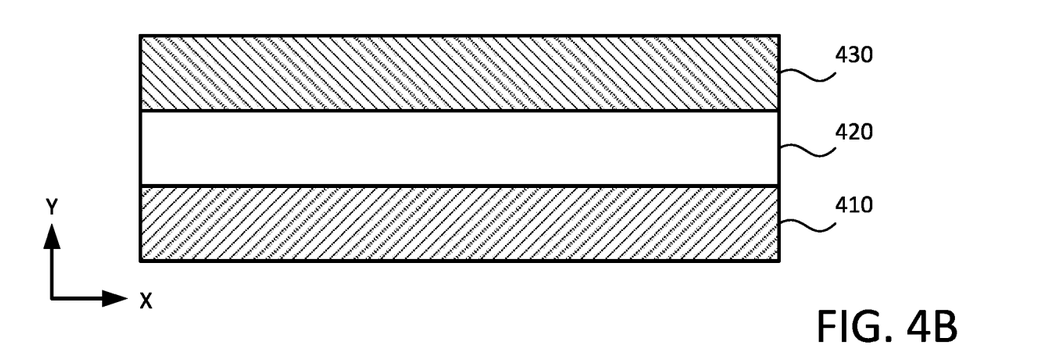
Figure 4C:
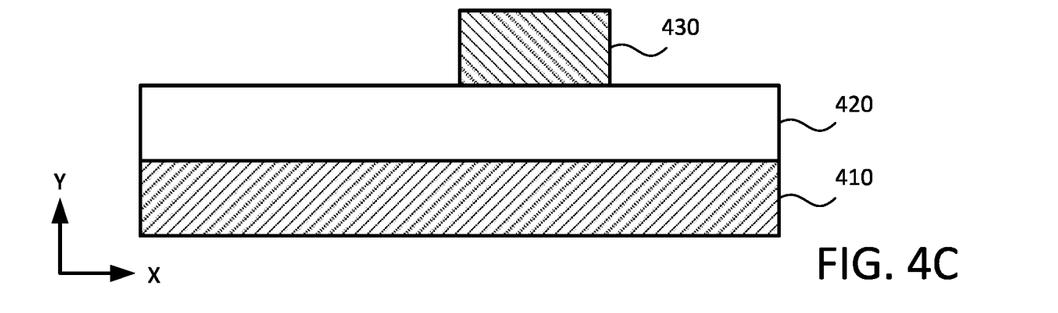
Figure 4D:
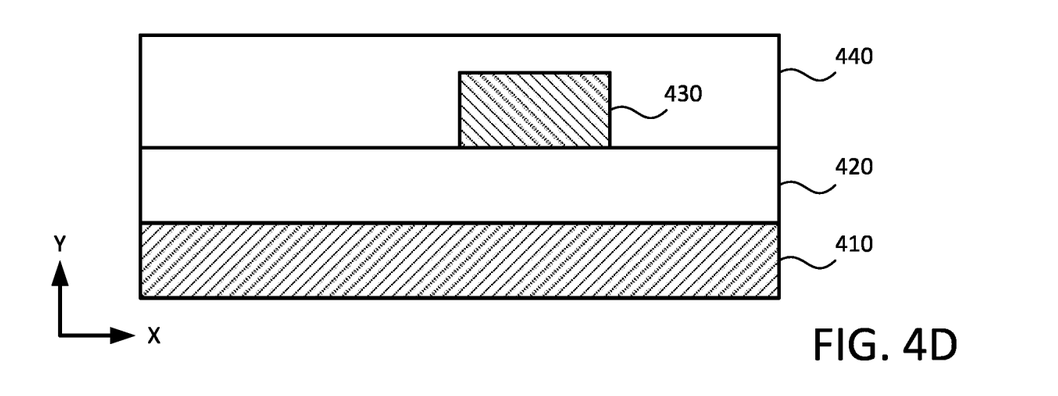
Figure 5A:
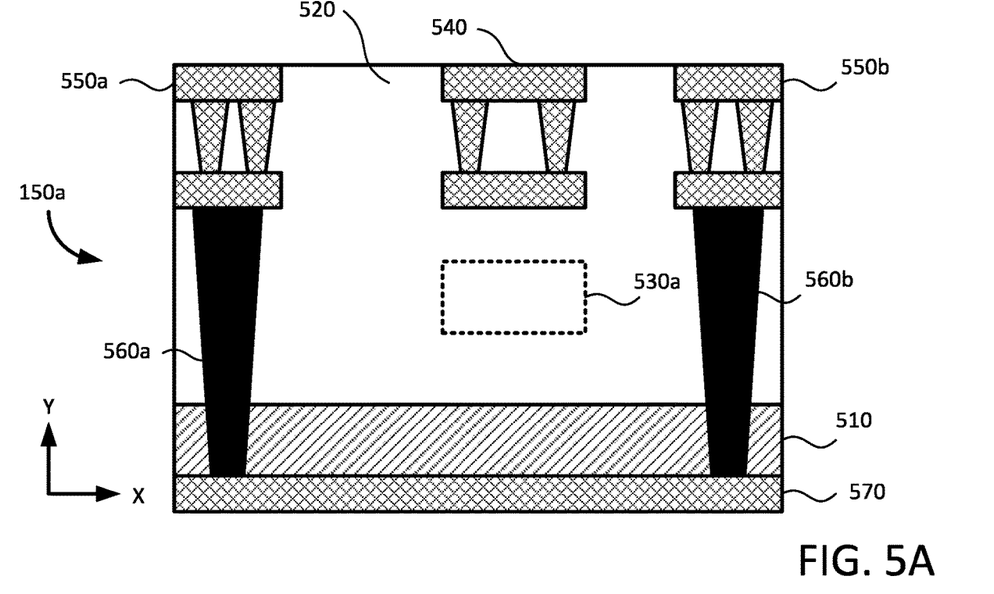
FIGS. 5A-5B illustrate cross-sectional views of two capacitance measurement points, according to embodiments of the present disclosure.
Figure 5B:
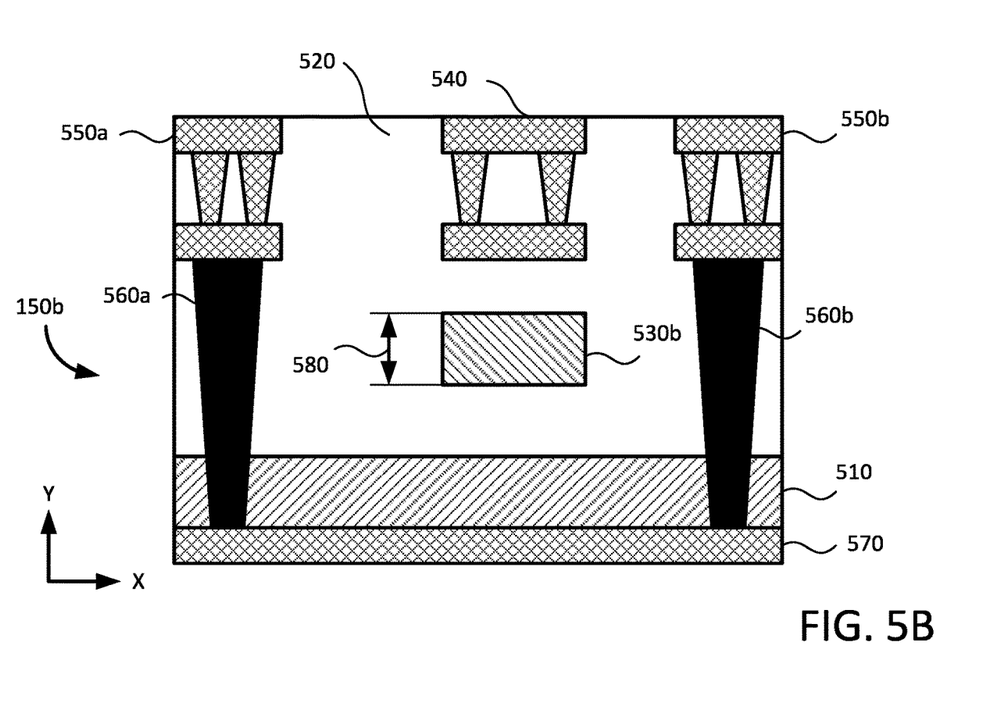

In various embodiments, the two capacitance measurement points 150 shown in FIGS. 5A-5B can be understood to be defined at different locations in a shared cross-sectional plane (e.g., a different locations on the x-axis in a shared XY plane), in different planes along a shared axis (e.g., at the same XY coordinates at different positions on a z-axis extending into or out of the page), or at different locations in different planes with one another and the cross-sectional views of the fabricated device in FIGS. 4A-4D. Other optical and electrical devices may be co-fabricated during method 300 in parallel to or in addition to the layers and capacitive measurement points 150 shown in FIGS. 4A-4D and 5A-5B.

Method 300 begins at block 310, where the fabricator forms a first layer 420 of an insulator material on a semiconductor substrate 410, such as is shown in FIG. 4A. In various embodiments, the substrate 410 is a silicon wafer in which various electrical traces or vias may be formed, and the insulator material used in the first layer 420 is Silicon Dioxide ($SiO_2$), although other semiconductor or core materials can be used for the substrate 410 and other insulating or cladding materials can be used for the first layer 420. In various embodiments, the fabricator may planarize (e.g., in a ZY plane) the first layer 420 as part of block 310 to define an even thickness of the insulator material in the y-direction. In other embodiments, the fabricator may define various surface features (e.g., protrusions or cavities) in the first layer 420 as part of block 310 to define the locations of various electrical or optical features during the fabrication process.

At block 320, the fabricator forms a second layer 430 of waveguide material on top of the first layer 420, such as is shown in FIG. 4B. In various embodiments, the waveguide material can be Silicon Nitride (SiN), Silicon (Si) or any other material for containing or directing optical signals through the photonic device.

At block 330, the fabricator removes portions of the second layer 430 such as is shown in FIG. 4C. In various embodiments, the fabricator may planarize (e.g., in a ZY plane) the second layer 430 to define an even thickness of the waveguide material in the y-direction. However, due to the deposition and planarization tools having process variations, the waveguide material in the second layer 430 may vary in thickness from a specified thickness (e.g., by ±5% in the y-direction), which can affect the optical properties of any of the optical devices 120 that include the waveguide material.

The fabricator may remove various sections of the waveguide material to define various waveguides or optical-signal-carrying segments of other optical devices 120 defined in the photonic chip 100. For example, portions of the second layer 430 in FIG. 4B are removed in the XY plane to result in the second layer 430 shown in FIG. 4C. Various physical and chemical etching processes may be used in block 330 to remove designated portions of the second layer 430, and once fabrication is complete, the shaped waveguide material can a free-standing waveguide, part of an optical device 120, or an area that includes the layer of waveguide material but is not designated for carrying optical signals in the final layout.

At block 340, the fabricator forms a third layer 440 of the insulator material over the remaining waveguide material, such as is shown in FIG. 4D. Although shown separately from the first layer 420, the third layer 440 and the first layer 420 are made of the same material as one another, and may act as a single insulator layer in the finalized photonic chip 100. In various embodiments, the fabricator may planarize (e.g., in a ZY plane) the third layer 440 to define an even thickness of the insulator material in the y-direction.

At block 350, the fabricator forms capacitance measurement points 150, according to embodiments of the present disclosure, such as are shown in FIGS. 5A and 5B. The capacitance measurement points 150 are designed as MIS-CAPs, in which at least one baseline capacitance measurement point 150a, such as in FIG. 5A, and at least one layered capacitance measurement point 150b, such as in FIG. 5B, are produced. Each capacitance measurement point 150 includes a primary contact point 540 of a conductive metal (i.e., the metal portion of the metal insulator semiconductor capacitor) that a capacitance measurement can be taken from. An insulator 520 (e.g., including both the first layer 420 and third layer 440 in FIG. 4D) separates the primary contact point 540 from the semiconductor 510 (e.g., the substrate 410 in FIG. 4D). A plate 570 made of a conductive metal is located on the other side of the semiconductor 510 relative to the insulator 520 and provides the opposing measurement location for capacitance (e.g., anode vs. cathode) relative to the primary contact point 540. Although shown "outside" of the semiconductor 510, in various embodiments the plate 570 may be included internally within the semiconductor 510.

In various embodiments, one or more secondary contact points 550a-b (generally or collectively secondary contact point 550) are connected by vias 560a-b (generally or collectively via 560) through the insulator 520 and semiconductor 510 to the plate 570, thus allowing measurement of capacitance when probes or contacts of a capacitance sensor 160 are connected to a primary contact point 540 and one (or more) associated secondary contact point 550 on the same side of the capacitance measurement point 150. The primary capacitance measurement points 150 may omit the secondary contact points 550 and vias 560 in various embodiments when measurement on opposite sides of the capacitance measurement points 150 is preferred.

In the baseline capacitance measurement point 150a, the pathway between the primary contact point 540 is composed of the insulator 520, whereas the layered capacitance measurement point 150b includes a portion of the layer of waveguide material (e.g., the second layer 430 from FIGS. 4B-4D). This portion of waveguide material (e.g., SiN) in the layered capacitance measurement point 150b is located in a second measurement region 530b (generally or collectively, measurement region 530) that corresponds to a first measurement region 530a in the baseline capacitance measurement point 150a that includes the insulator material (e.g., $SiO_2$). Due to the layered construction of the capacitance measurement points 150, the respective measurement regions 530 are located at the same given distance from the semiconductor 510 (e.g., due to the height of the first layer 420 on which the second layer 430 is deposited per FIGS. 4A and 4B). The first measurement region 530a can thus be understood as a region that omits the waveguide material, and is instead filled with the insulator material, which replaces the waveguide material and fills in the corresponding space. The two capacitance measurement points 150 are otherwise (nominally) identical to one another.

When measuring the capacitances across a paired baseline capacitance measurement point 150a and layered capacitance measurement point 150b, the difference in capacitance measurements is correlated to a thickness 580 of the waveguide material in the second measurement region 530b. Because the thickness of the second layer 430 (that deposited the waveguide material included in the second measurement region 530b) is expected to be consistent over the body of the photonic chip 100, despite having an initially unknown thickness due to manufacturing tolerance variances, the measurable thickness 580 of the waveguide material in the second measurement region 530b can be used to determine corresponding thicknesses elsewhere in the photonic chip. Method 600, discussed in relation to FIG. 6, discusses the measurement and application thereof in greater detail.

The fabricator may also form (in parallel or in addition to forming the capacitance measurement points in block 350) various additional electrical components along with the capacitance measurement points 150, such as, for example, biasing circuits 170, electrical traces, vias 560 (e.g., through-silicon vias), and the like.

At block 360, the fabricator forms the various other optical components included in the photonic chip 100. These components can include the various light sources 110, optical devices 120, optical switches 130, optical combiners 140, and optical ports 180 shown in FIGS. 1A and 1B, as well as various other components for handling and processing optical signals. These optical components may be formed through various layering, deposition, and etching processes in parallel to in addition to the formation of the capacitance measurement points 150 and any electrical components included in the photonic chip 100.

Figure 6:
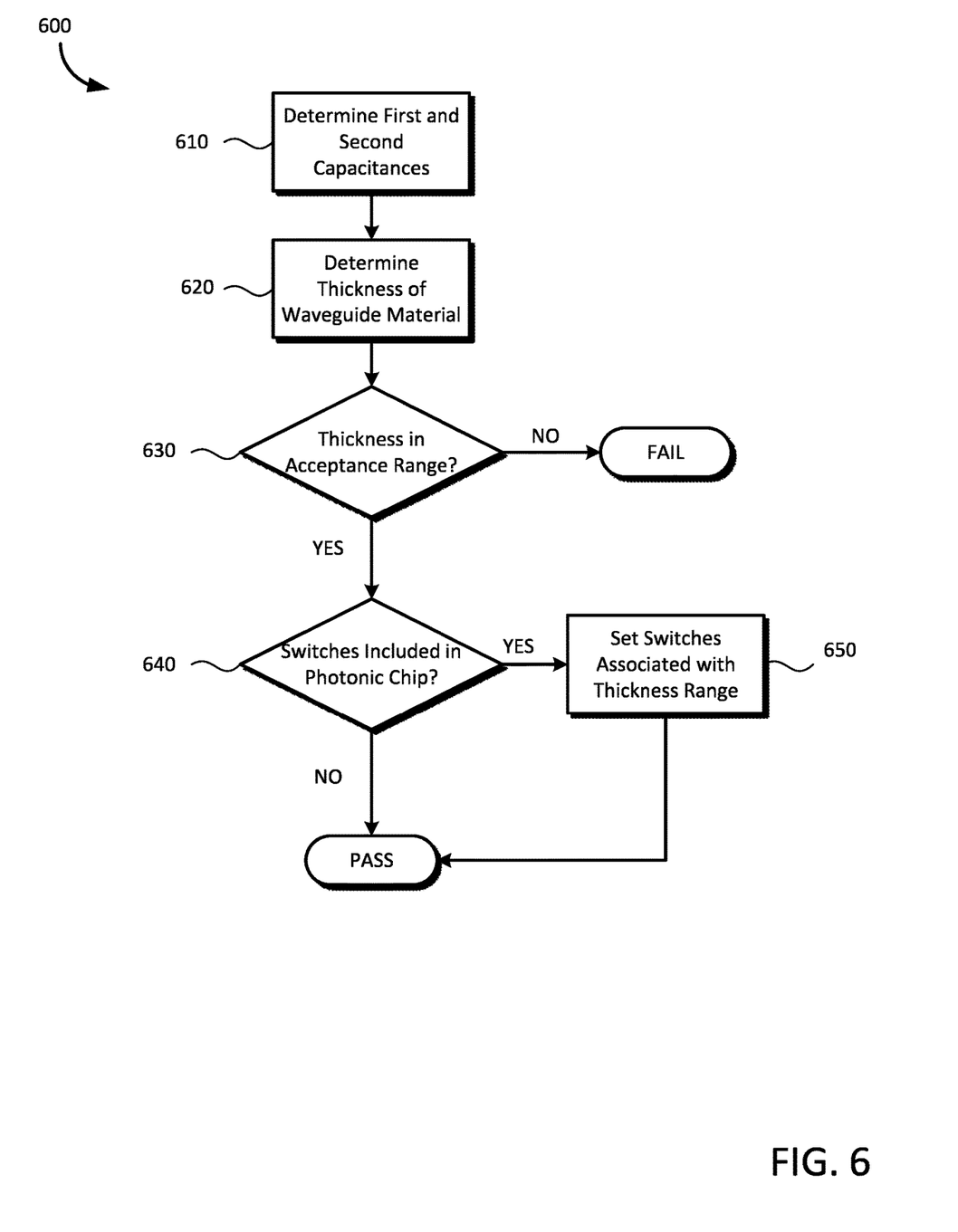
FIG. 6 is a flowchart of a method for testing a photonic chip via capacitance measurement points, according to embodiments of the present disclosure.

FIG. 6 is a flowchart of a method 600 for testing a photonic chip 100 via capacitance measurement points 150, according to embodiments of the present disclosure. Method 600 begins at block 610, where a capacitance measurement sensor 160 determines a first capacitance at a paired baseline capacitance measurement point 150a and layered capacitance measurement point 150b. The first capacitance ($C_1$), determined from the baseline capacitance measurement point 150a corresponds to the capacitance of the photonic chip 100 through an insulator, whereas the second capacitance ($C_2$), determined from the layered capacitance measurement point 150b, corresponds to the capacitance of the photonic chip 100 through an insulator and the waveguide material.

The first capacitance $C_1$ and the second capacitance $C_2$ therefore are understood according to Formulas 1 and 2 to include capacitances of the shared insulator region common to both capacitance measurement points 150 and the respective measurement regions 530, where $C_{in}$ is the capacitance of the shared insulator, $C_{in'}$ is the capacitance of the insulator included in the first measurement region 530a, and $C_{wg}$ is the capacitance of the waveguide material included in the second measurement region.

$1/C_1 = 1/C_{in} + 1/C_{in'}$ [Formula 1]

$1/C_2 = 1/C_{in} + 1/C_{wg}$ [Formula 2]

At block 620 the capacitance sensor 160 (or an associated computing device) determines a thickness of the waveguide material using the capacitances determined per block 610. The thickness (t) of the waveguide material can be determined according to Formulas 3 and 4, where A is the area of the capacitors in the capacitance measurement points 150 and $\varepsilon_0$ is the permittivity of free space (e.g., $8.85 \times 10^{-12}$ m$^{-3}$ kg$^{-1}$ s$^4$ A$^2$) and $\varepsilon_{in'}$ and $\varepsilon_{wg}$ are the dielectric constants of the materials in region 530a and 530b respectively.

$1/C_1 - 1/C_2 = 1/C_{in'} - 1/C_{wg} = t/[\varepsilon_0 * A * (\varepsilon_{in} - \varepsilon_{wg})]$ [Formula 3]

$t = [\varepsilon_0 * A * (\varepsilon_{in} 31 \varepsilon_{wg})] * (1/C_1 - 1/C_2)$ [Formula 4]

At block 630 the capacitance sensor 160 (or an associated computing device) determines whether the thickness (t) of the waveguide material is within at least one acceptance range for the photonic chip 100. When the thickness is within the acceptances ranges, method 600 proceeds to block 640. Otherwise, when the thickness is outside of all of the acceptance ranges, method 600 may conclude by failing test of the photonic chip 100. For example, when the photonic chip 100 includes acceptance ranges for thicknesses of A to B, B to C, and C to D, when the measured thickness is between the outer ranges (e.g., A<t<D), method 600 proceeds to block 640, otherwise method 600 may conclude.

At block 640 the capacitance sensor 160 (or an associated computing device) determines whether the photonic chip 100 includes switches to control the routing of optical signals to various optical devices 120 included in the photonic chip 100. When the photonic chip 100 includes switches (e.g., optical switches 130 and optical combiners 140 controlled by biasing circuits 170), method 600 proceeds to block 650. Otherwise method 600 may conclude by passing test of the photonic chip 100, allowing a user to manually or externally control the routing of optical signals to the various optical devices 120 or pass test for a single-route optical device.

At block 650 the capacitance sensor 160 (or an associated computing device) sets the switches associated with the determined thickness range that the measured thickness falls within to route optical signals through the associated optical devices 120. For example, when the photonic chip 100 includes acceptance ranges for thicknesses of A to B, B to C, and C to D, and the thickness falls within range B to C (and not within the ranges of A to B or C to D), the capacitance measurement sensor 160 sets a biasing voltage in one or more biasing circuits 170 to route the optical signals to the optical devices 120 associated with the thickness range of B to C (and not to other optical devices 120 associated with thickness ranges of A to B or C to D). When the determined thickness range for the measured thickness falls within a different thickness range (e.g., from A to B), the capacitance measurement sensor 160 sets the biasing voltage in the biasing circuits 170 to instead direct the optical signals to the optical devices 120 associated with the different thickness range. Accordingly, the fabricator can measure the thickness of an optical layer based on the electrical properties of that optical layer within the photonic chip 100 and configure the operation of the photonic chip 100 based on the associated optical characters for the measured thickness.

Method 600 may then conclude by passing test of the photonic chip 100 with the biasing values set to route the optical signals to the optical devices 120 that are configured to operate within specification for the given thickness of the waveguide material.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product.

Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system, including:
   a plurality of optical devices including a first material embedded in a second material, wherein each optical device of the plurality of optical devices is associated with a different thickness range of a plurality of thickness ranges for the first material, and wherein the first material comprises a semiconductor material; and
   a capacitive sensor, configured to:
      measure a first capacitance at a first capacitance measurement point including the first material embedded in the second material and a second capacitance at a second capacitance measurement point including a region from which the first material has been replaced with the second material; and
      select, based on the first capacitance and the second capacitance, a given optical device of the plurality of optical devices.

2. The system of claim 1, further comprising:
   a plurality of switches configured to selectively route an optical pathway through one of the plurality of optical devices; and
   a biasing circuit, configured to set the plurality of switches to the given optical device of the plurality of optical devices selected based on the first capacitance and the second capacitance, a given optical device of the plurality of optical devices.

3. The system of claim 1, wherein the first capacitance measurement point is defined in a first plane, and the second capacitance measurement point is defined in a second plane parallel to the first plane.

4. The system of claim 1, wherein the first capacitance measurement point and the second capacitance measurement point are metal-insulator-semiconductor capacitors (MISCAPs).

5. The system of claim 1, wherein the first material is Silicon Nitride (SiN) and the second material is Silicon Dioxide (SiO2).

6. The system of claim 1, wherein each optical device of the plurality of optical devices is configured to operate within a shared operational specification when a thickness of the first material is within a thickness range of the plurality of thickness ranges for the first material associated with a given optical device.

7. The system of claim 1, wherein the first material is surrounded by the second material.

8. A method, comprising:
   forming a first measurement region of a waveguide material in a waveguide layer;
   forming a second measurement region in the waveguide layer that omits the waveguide material;
   filling the second measurement region with an insulator material;
   forming a first capacitance measurement point that includes a plurality of waveguides formed in the waveguide layer and the first measurement region; and
   forming a second capacitance measurement point that includes the plurality of waveguides and the second measurement region.

9. The method of claim 8, wherein the insulator material is Silicon Dioxide (SiO2) and the waveguide material is Silicon Nitride (SiN).

10. The method of claim 8, wherein the first capacitance measurement point and the second capacitance measurement point are metal-insulator-semiconductor capacitors (MISCAPs).

11. The method of claim 8, further comprising:
    forming a plurality of switches that are configured to selectively route an optical pathway through one of the plurality of waveguides.

12. The method of claim 11, further comprising:
    determining a first capacitance at the first capacitance measurement point and a second capacitance at the second capacitance measurement point;
    determining a thickness range of the waveguide layer based on the first capacitance and the second capacitance; and
    setting the plurality of switches to define the optical pathway through a subset of waveguides of the plurality of waveguides, wherein the subset of waveguides is associated with optical characteristics corresponding to the thickness range.

13. The method of claim 12, wherein the optical pathway is defined though the subset of waveguides corresponding to multiplexers or demultiplexers configured to operate within a shared operational specification when the waveguide layer is within the determined thickness range, wherein remaining waveguides of the plurality of waveguides correspond to other multiplexers or demultiplexers configured to operate within the shared operational specification when the waveguide layer is outside of the determined thickness range in a different thickness range.

14. A system, including:
    a plurality of optical devices including a first material embedded in a second material, wherein each optical device of the plurality of optical devices is associated with a different thickness range of a plurality of thickness ranges for the first material, wherein the first material comprises a semiconductor material, and wherein the plurality of optical devices are demultiplexers or multiplexers.

15. The system of claim 14, wherein the first material is surrounded by the second material.

16. The system of claim 14, wherein the first material is Silicon Nitride (SiN) and the second material is Silicon Dioxide (SiO2).

17. A system, including:
    a plurality of optical devices including a first material embedded in a second material, wherein each optical device of the plurality of optical devices is associated with a different thickness range of a plurality of thickness ranges for the first material, wherein the first material comprises a semiconductor material, and wherein the first material defines optical paths included in the plurality of optical devices.

18. The system of claim 17, wherein the first material is surrounded by the second material.

19. The system of claim 17, wherein the first material is Silicon Nitride (SiN) and the second material is Silicon Dioxide (SiO2).

20. The system of claim 17, wherein the plurality of optical devices are demultiplexers or multiplexers.

* * * * *

UNITED STATES PATENT AND TRADEMARK OFFICE
CERTIFICATE OF CORRECTION

PATENT NO. : 12,276,565 B2
APPLICATION NO. : 18/297412
DATED : April 15, 2025
INVENTOR(S) : Xunyuan Zhang et al.

It is certified that error appears in the above-identified patent and that said Letters Patent is hereby corrected as shown below:

On the Title Page

Item (72), Inventors,
Under Column no. 1, Line no. 4, Replace:
"Mark A Webster"
With:
--Mark A. Webster--

In the Specification

Under Column no. 4, Line no. 30, Replace:
"0-7"
With:
--0-π--

Under Column no. 7, Line no. 46, second occurrence Replace:
"a"
With:
--to a--

Under Column no. 8, Line no. 19, Replace:
"a"
With:
--to a--

Under Column no. 11, Line no. 67, Replace:
"$t=[\varepsilon_0*A*(\varepsilon_{in}31\varepsilon_{wg})]*(*1/C_1-1/C_2)$"
With:
--$t = [\varepsilon_0 * A*( \varepsilon_{in'} - \varepsilon_{wg})]*(*1/C_1 - 1/C_2)$--

Signed and Sealed this
Twenty-sixth Day of August, 2025

Coke Morgan Stewart
*Acting Director of the United States Patent and Trademark Office*